United States Patent [19]

Millett et al.

[11] 4,318,184

[45] Mar. 2, 1982

[54] INFORMATION STORAGE AND RETRIEVAL SYSTEM AND METHOD

[76] Inventors: Ronald P. Millett, 3985 N. 850 East, Provo, Utah 84601; Dell K. Allen, 195 S. Inglewood Dr., Orem, Utah 84057

[21] Appl. No.: 939,630

[22] Filed: Sep. 5, 1978

[51] Int. Cl.³ .................... G06F 7/06; G06F 15/40; G06F 3/14

[52] U.S. Cl. .................................................. 364/900

[58] Field of Search ... 364/200 MS File, 900 MS File, 364/300

[56] References Cited

U.S. PATENT DOCUMENTS

| | | | |
|---|---|---|---|
| 3,388,381 | 6/1968 | Prywes et al. | 364/200 |
| 3,643,226 | 2/1972 | Loizides et al. | 364/900 |
| 3,670,310 | 6/1972 | Bharwani et al. | 364/200 |
| 3,678,461 | 7/1972 | Choate et al. | 364/200 |
| 3,678,470 | 7/1972 | Choate et al. | 364/200 |
| 3,699,531 | 10/1972 | Heimann | 340/721 |
| 3,716,840 | 2/1973 | Masten et al. | 364/200 |
| 3,725,875 | 4/1973 | Choate et al. | 364/200 |
| 3,737,864 | 6/1973 | Werner | 364/200 |
| 3,916,387 | 10/1975 | Woodrum | 364/200 |
| 4,056,711 | 11/1977 | Lamar | 364/200 |
| 4,068,224 | 1/1978 | Bechtle et al. | 340/324 AD |
| 4,068,298 | 1/1978 | Dechant et al. | 364/200 |
| 4,068,301 | 1/1978 | Ishino et al. | 364/200 |
| 4,068,303 | 1/1978 | Morita | 364/200 |
| 4,074,235 | 2/1978 | Thomas | 364/900 |
| 4,085,446 | 4/1978 | Nagamura | 364/900 |
| 4,086,628 | 4/1978 | Woodrum | 364/200 |

OTHER PUBLICATIONS

"Automated Manufacturing Planning", Russell H. Reals, American Society of Mechanical Engineers Conf., May 9-12, 1966.
"AUTOPROS Automated Process Planning Sys.", Chr. Kjärgaard Nissen, CIRP International Conf. Sep. 11th-13th, 1969.
"An Analytical Technique for the Selection of Manufacturing Operation", Benj. W. Niebel, The Journal of Industrial Eng., vol. XVII, No. 11.
*Computer Data Base Organization,* James Martin (1975) pp. 271, 339-341, 344, 354, 358, 373, 408, 410-411.
"CCMSS: Guide Computer-Controlled Microform Search System", Revised 8-1978, U.S. Dept. of Commerce.

*Primary Examiner*—Gareth D. Shaw
*Assistant Examiner*—Eddie P. Chan
*Attorney, Agent, or Firm*—H. Ross Workman; Rick D. Nydegger

[57] ABSTRACT

A computerized system and method for electronically storing, retrieving, separating, comparing and interrelating data which is maintained in a predetermined classification scheme. Data is electronically stored under the predetermined classification scheme in the form of hierarchal information trees. Data corresponding to a selected attribute may be found in an information tree by using a CRT terminal to scan the various levels of the hierarchy of the tree. As the various levels of the tree are scanned, nodes in each level of the tree are selected in accordance with the desired attribute which is being searched. The selection of various nodes in the levels of the information tree defines one or more concurrent paths through the tree which provide access to all data classified under the information tree corresponding to the attribute being searched. A CPU generates an encoded representation for each set of concurrent paths that are searched through the information tree. Each set of encoded paths is identified by a keyword that corresponds to one of the searched attributes and each keyword with its associated set of encoded paths is stored. The stored keywords and their associated encoded paths may be selectively retrieved and combined in a logical arithmetic unit to produce a particular set of encoded paths which provides concurrent multiple path access through the hierarchal information tree to all data corresponding to a desired combination of attributes. Alternatively, each retrieved set of paths may be used to identify an attribute that is stored in a hierarchal decision table tree, thereby providing access through the decision table tree to all data corresponding to the desired combination of attributes. A special purpose module is also provided which operates to compact the format of the encoded path representations prior to their storage and which also operates to re-expand the format of the encoded path representations after their retrieval and prior to manipulation in the logical arithmetic unit.

7 Claims, 15 Drawing Figures

|  KEYWORDS | ENCODED SET OF PATHS |
| --- | --- |
| A | 1 1 1 1 0 0 0 0 1 1 |
| HOLES | 1 1 0 0 1 1 0 0 |
| CLASS 1 | 1 0 0 1 0 1 0 |
| STEEL | 0 1 0 0 0 1 |

STORAGE DISK
PART NO. 1 0 1 1 1 1 1 1 0 1 0 1 1

INFORMATION STORAGE AND RETRIEVAL SYSTEM AND METHOD

BACKGROUND

1. Field of the Invention

The present invention relates to computerized systems and methods for information storage and retrieval, and more particularly the present invention relates to a computerized system and method for the compact storage and rapid retrieval and manipulation of data that is classified and stored in the form of hierarchal information trees.

2. The Prior Art

Computerized information storage and retrieval systems have long been used to help keep track of materials and parts used at large manufacturing facilities. For example, some aircraft manufacturing companies may have as many as a half a million active parts in their inventory at any given time. Many of the parts used by aircraft manufacturing companies or other large manufacturing facilities are made by the companies themselves from raw materials which are kept on hand.

One of the major problems which these types of large manufacturing facilities have experienced in the past is the problem of how to insure that the manafacturing process for the same or similar parts is both uniform and as efficient as possible. Inefficient routing of a part from one work station to another work station may give rise to additional time and expense in manufacturing the part. Furthermore, failure to follow the same manufacturing process for subsequent parts which are the same or similar to parts previously manufactured further contributes to wasted time and inefficiency in making the parts.

Prior attempts to achieve uniformity and standardization in the process plans used by large manufacturing facilities have relied upon the development of generic process plans for certain part families. Under this type of system, the various parts which are made and stored are first classified into part families. For each part family, a generic process plan is then developed. When it is desired to produce a particular part, the appropriate generic process plan is retrieved and the process planner then modifies the generic plan to meet the requirements of the particular part which is to be made.

Although this system has helped to reduce the nonuniformity and has helped to eliminate some of the waste involved in manufacturing plants which must make a wide variety of parts, it will nevertheless be appreciated that much nonuniformity and inefficiency is still inherent in the system because each generic plan must be modified to meet the particular needs of each part that is to be made. Furthermore, since typically many process planners are employed, inconsistencies further develop because one process planner may not modify the generic plan in the same way as a more experienced process planner might.

It can thus readily be appreciated that it would be highly desirable to be able to provide a computerized information storage and retrieval system capable of quickly generating, storing and accessing individualized process plans for each of the parts manufactured at a large manufacturing facility. Unfortunately, present computerized information storage and retrieval systems are not efficient enough to be able to economically provide this capability.

The efficiency of computerized information storage and retrieval systems is a function of how compactly the data may be stored and how quickly the data may be retrieved, separated, compared and interrelated.

Prior art information storage and retrieval systems have relied upon the use of lists to access and manipulate computerized data. These lists are generated by searching through the data base for classes of data corresponding to a selected attribute. In this manner, several long lists of data may be generated, each list of data corresponding to a particular attribute. Since some classes of data may correspond to more than one attribute, data is often redundantly stored in several lists.

In order to then separate or combine that data which corresponds to a given combination of attributes, it is necessary to compare each item in one list with each of the items in the other lists. As can be appreciated, searching through a large data base, generation of long lists and the individual comparison item by item between these lists is disadvantageous in that it results in redundant storage of information, long retrieval times and difficult manipulation of data that is retrieved. This is particularly true where the generated lists require storage on secondary storage devices such as magnetic disks, which are mechanically slow and difficult to operate.

Other prior art systems for information storage and retrieval have attempted to eliminate some of the foregoing problems by using lists and pointers. In this type of system, each item in the generated list is provided with an encoded instruction which points to the location of the next item whether it is in the same or an adjacent list. Although this may somewhat help to eliminate redundant storage of information, retrieval time and manipulation of the retrieved data is nevertheless long and relatively difficult.

Accordingly, what is needed is a computerized information storage and retrieval system capable of more efficiently storing, retrieving, separating or otherwise interrelating large bodies of data. Such an invention is described and claimed herein.

BRIEF DESCRIPTION AND OBJECTS OF THE INVENTION

The computerized information storage and retrieval system and method of the present invention provide highly compact storage and concurrent multiple path access to data that is stored and classified under a hierarchal information tree. The system and method of the present invention also provide rapid manipulation of encoded path representations so as to more efficiently effect separation, comparison and interrelation of retrieved data.

It is therefore a primary object of the present invention to provide a novel system and method for computerized information storage and retrieval.

Another primary object of the present invention is to provide a computerized information storage and retrieval system and method which eliminate the need for directly manipulating the data base with lists and pointers by providing for concurrent multiple path access to selected data that is stored and classified under a hierarchal information tree.

A further object of the information storage and retrieval system and method of the present invention is to provide rapid manipulation of encoded path representations so as to permit more efficient separation, comparison and interrelation of data accessed through multiple paths of the information tree.

Yet another object of the present invention is to provide a computerized information storage and retrieval system capable of utilizing retrieved data in rapid, multi-variable decision making.

Another object of the computerized information storage and retrieval system of the present invention is to provide for highly compact data storage.

Another object of the present invention is to significantly reduce the cost and time associated with computerized information storage and retrieval.

These and other objects and features of the present invention will become more fully apparent from the following description and appended claims taken in conjunction with the accompanying drawings.

DETAILED DESCRIPTION OF THE PREFERRED EMBODIMENTS

Reference is now made to the figures wherein like parts are designated with like numerals throughout.

1. General

Those of ordinary skill in the art will readily recognize that the information storage and retrieval system and method of the present invention may be adapted to any of a wide variety of applications, including library applications, failure diagnostics, retrieval of test data, tool and die design, generation of parametric designs using computer graphics, production of comprehensive work piece statistics for part drawing files, or inventory control and monitoring. Attention is therefore initially directed to a general description of the system and method of the present invention. The general description is then followed by a description of a particular embodiment of the information storage and retrieval system of the present invention as applied to the problem of process planning in large manufacturing facilities.

Figure 1:
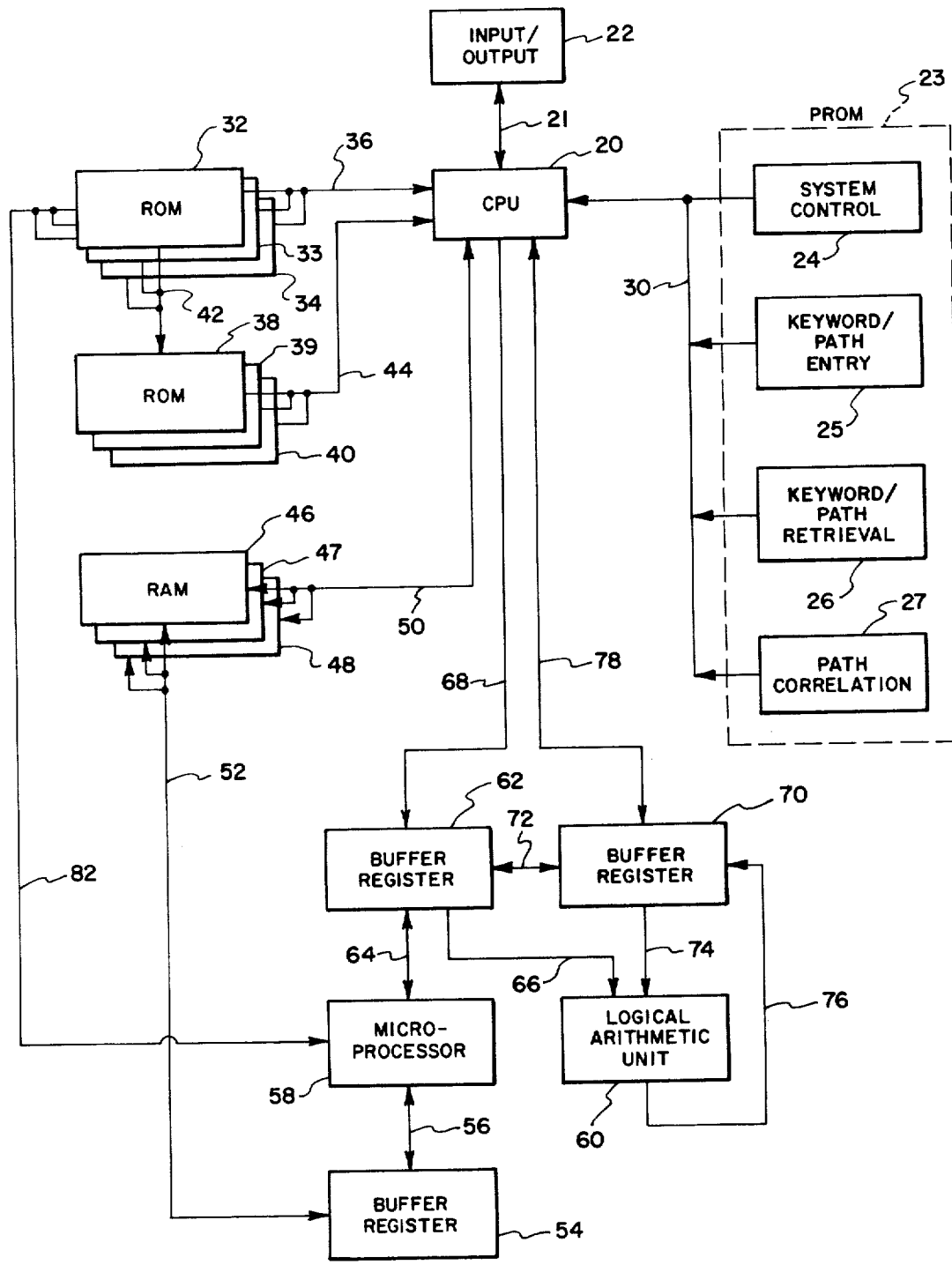
FIG. 1 is a functional block diagram illustrating the components of the computerized information storage and retrieval system of the present invention.

The components of the information storage and retrieval system of the present invention are functionally illustrated in the block diagram of FIG. 1. As shown in FIG. 1, a central processing unit (CPU) 20 is connected by line 21 to an input/output device 22. The CPU 20 may be any one of several types of commerically available main-frame computers, minicomputers or microprocessors. For example, CPU 20 may be an IBM 360/370 series main-frame computer, an HP 3000 or PDP 11 minicomputer or a Billings 102 microprocessor. In the preferred embodiment of the invention, input/output device 22 is a CRT terminal. Clearly, other suitable types of input/outout devices could be used.

As will be hereinafter more fully described, the information storage and retrieval system of the present invention is operated according to a series of programmed instructions. The operational instructions for the system are functionally divided into a system control segment 24, a keyword/path entry segment 25, a keyword/path retrieval segment 26 and a path correlation segment 27. Each of the instructional segments 24–27 may be electronically stored on a programmable read only memory (PROM) 23 or other suitable electronic memory device which is electrically connected to CPU 20 as schematically illustrated by line 30.

The data base which is manipulated by the information storage and retrieval system is electronically stored and classified in the form of hierarchal information trees. These trees are the result of applying classification theory to a given set of data. For example, as illustrated generally in FIG. 2, a given set of data may be broken down into subsets of data which are designated by the letters A, B and C. Each of these subsets may be further broken down into additional subsets and so on. In this manner, a hierarchy of linked subsets is developed which may be used to classify the data. Thus, in the example illustrated in FIG. 2, the data is broken down into a hierarchy having four levels of data. Each level in the hierarchy consists of several decisional branches which are called nodes. Nodes A through C represent the first level in the hierarchy, nodes D through K represent the second level in the hierarchy, nodes L through T represent the third level in the hierarchy and nodes U through V represent the fourth level in the hierarchy.

Referring again to FIG. 1, it will be seen that external secondary storage devices 32-34 are connected to the CPU 20 as schematically illustrated by line 36. The secondary storage devices 32-34 may be any suitable type of electronic storage medium such as a disk or tape. In the illustrated embodiment, secondary storage devices 32-34 are read only memory (ROM) integrated circuits. The ROM circuits 32-34 are used to electronically store the data which is classified in the form of a hierarchal information tree. Thus, for the hierarchal information tree generally illustrated in FIG. 2, each of the nodes A through V would be electronically stored in a discrete storage address in one of the ROM circuits 32-34. As hereinafter more fully described, this data is selectively recalled by the CPU 20 when it is desired to search and retrieve selected information.

Each of the ROM circuits 32-34 is also interconnected as at line 42 to the additional ROM circuits 38-40. ROM circuits 38-40 are in turn connected through line 44 to CPU 20. Alphanumeric descriptions for each of the nodes A-V are stored in corresponding locations in the ROM circuits 38-40. This enables the CPU 20 to output on the CRT terminal 22 an alphanumeric description for each level in the hierarchy of the information tree. For example, as described more fully below, CPU 20 may sequentially recall each level in the hierarchy of the information tree. As each level in the hierarchy of the tree is called by CPU 20, the corresponding alphanumeric descriptions for each of the nodes A-V in the level of the hierarchy which has been recalled will be accessed through line 42 and sent through line 44 to CPU 20 so that these alphanumeric descriptions can be output on the screen of the output device 22.

A third set of external secondary storage devices 46-48 are connected through line 50 to CPU 20. In the preferred embodiment, the storage devices 46-48 are random access memory (RAM) integrated circuits. As hereinafter more fully described, CPU 20 uses the RAM circuits 46-48 for storage of keywords which are each associated with a set of encoded paths. CPU 20 may retrieve at random any desired keyword with its associated set of encoded paths. Each set of encoded paths enables multiple path access to data classified under the hierarchal information tree.

Each of the RAM circuits 46-48 and ROM circuits 32-34 and 38-40 are well known in the art and are commercially available integrated circuits. Clearly, the number of ROM and RAM circuits may be varied in accordance with the size of the data base which is to be manipulated by the information storage and retrieval system.

RAM circuits 46-48 are interconnected through line 52 to a register 54. Register 54 is in turn electrically connected by line 56 to a special purpose module 58. The special purpose module 58 is a specially programmed microprocessor integrated circuit. Special purpose module 58 may be, for example, an Intel 8080 integrated circuit. Module 58 is programmed as described below so that prior to storage in the RAM circuits 46-48, the format for the encoded set of paths may be compacted so as to achieve maximum efficiency in the utilization of the RAM storage circuits 46-48. Storage register 54 also acts as a buffer between RAM circuits 46-48 and special purpose module 58.

Additionally, special purpose module 58 operates to expand the format of an encoded set of paths back to their original format so that the set of encoded paths may thereafter be combined with other encoded paths in a logical arithmetic unit 60. A second storage register 62 is connected through line 64 to the special purpose module 58, through line 66 to logical arithmetic unit 60 and through line 68 to CPU 20. The register 62 acts as a buffer between CPU 20 and special purpose module 58 for purposes of holding data that is to be compacted prior to storage in the RAM circuits 46-48. Register 62 also acts as a buffer between special purpose module 58 and the logical arithmetic unit 60. Thus, as data is retrieved from the RAM circuits 46-48 and expanded by special purpose module 58 back to the original format for the data, it is sent to register 62. As hereinafter more fully described, the expanded format data held by register 62 may thereafter be transferred to a third register 70 or to the logical arithmetic unit 60.

Register 70 is used to hold data which is to be gated into the logical arithmetic unit 60. For example, a first set of encoded paths may be retrieved from RAM circuits 46-48 and expanded back to the original format for the data and then held in storage register 70. Subsequently, a second set of encoded paths may be retrieved from RAM circuits 46-48, expanded back to the original format and then held in register 62. The contents of register 62 and register 70 are then transferred through lines 66 and 74 to logical arithmetic unit 60. Logical arithmetic unit 60 thereafter combines the data according to a preselected command. The resulting data is then transferred from the logical arithmetic unit 60 through line 76 back to storage register 70. The resulting data may then be transferred through line 72 back to register 62, compacted by special purpose module 58 and stored in the RAM circuits 46-48. Alternatively, the resulting data stored in register 70 may be transferred through line 78 to CPU 20 which may in turn output a description of the data through line 21 to the output device 22. The resulting data which is held by register 70 may also be held until additional data has been retrieved from RAM circuits 46-48 and may thereafter be further combined in logical arithmetic unit 60.

Figure 3:
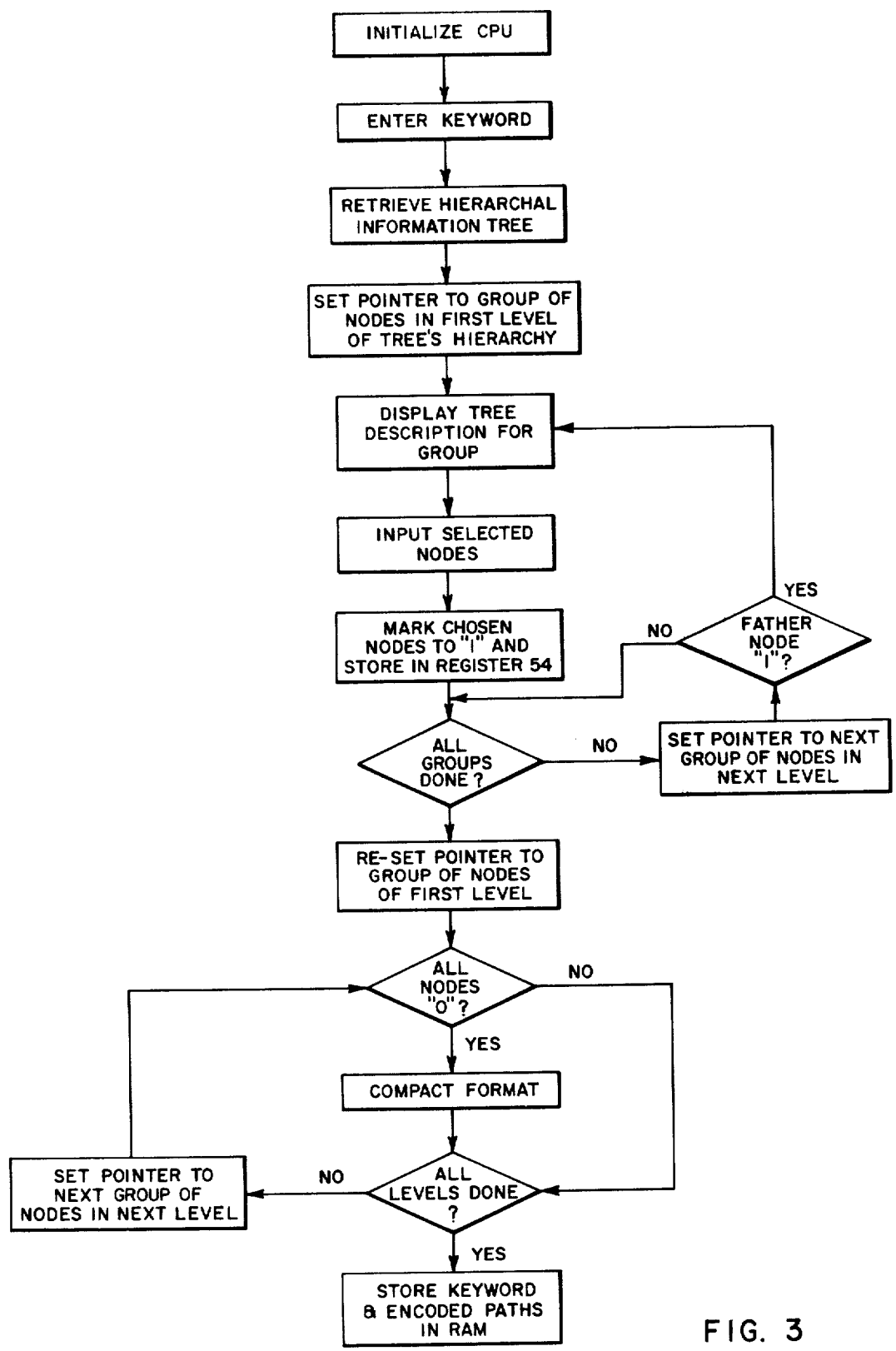
FIG. 3 is a procedural flow diagram illustrating the method for searching and encoding a set of paths which have been searched through a hierarchal information tree.
Figure 7A:
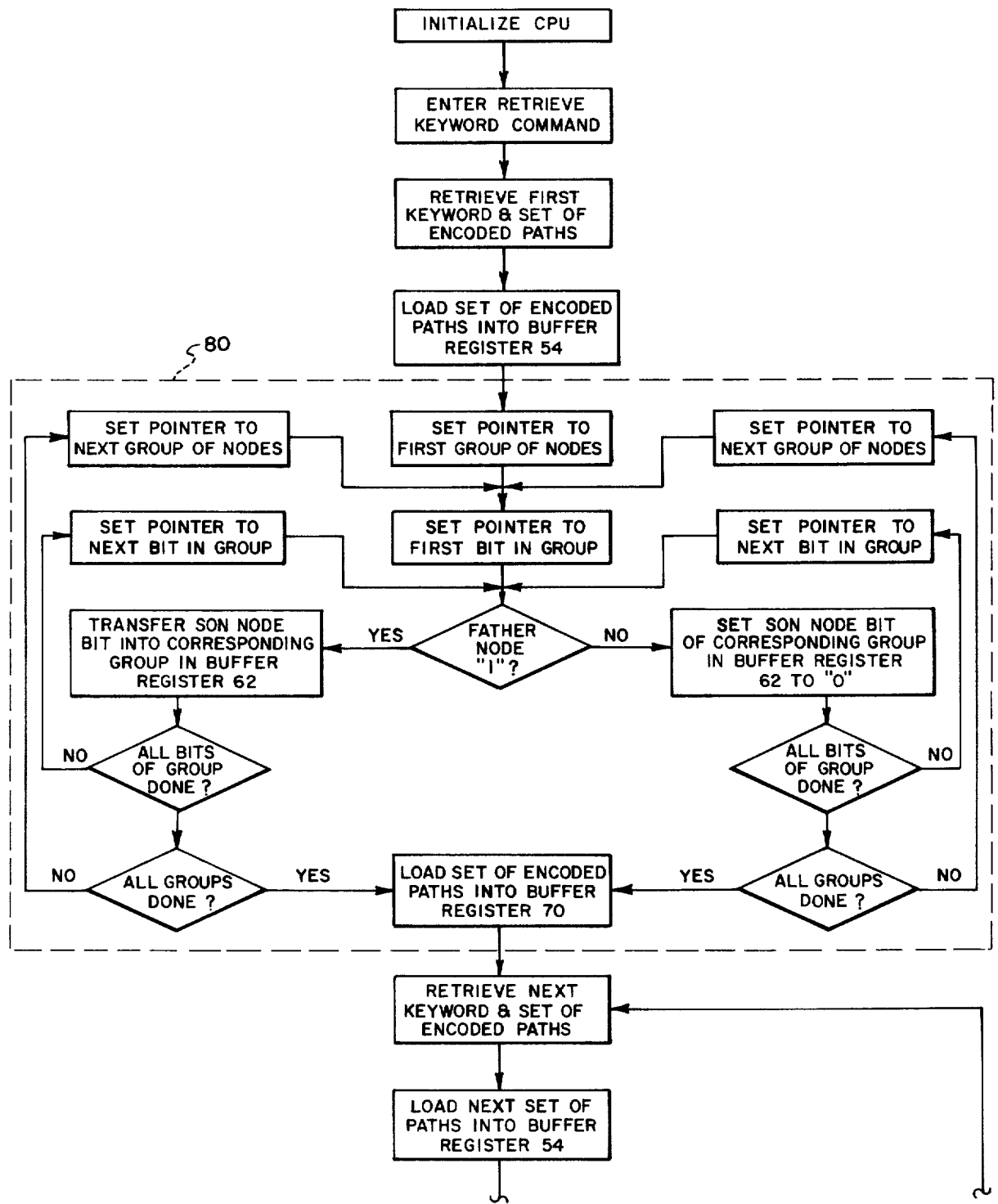
FIG. 7A is a procedural flow diagram illustrating the method for retrieving and combining one or more encoded sets of paths.
Figure 7B:
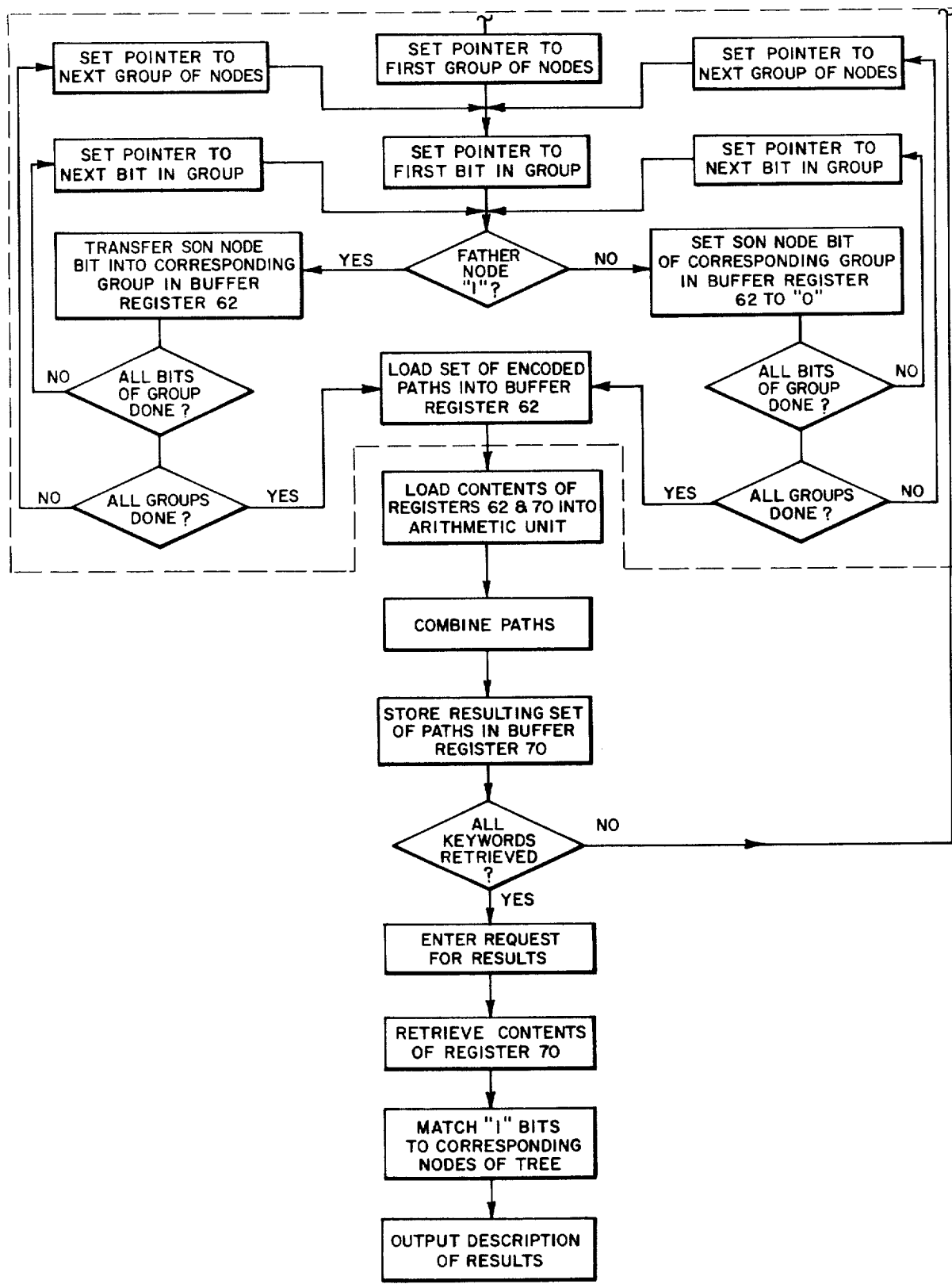
FIG. 7B is a continuation of the procedural flow diagram illustrated in FIG. 7A.

As previously indicated, the computerized information storage and retrieval system generally described above is programmed to operate according to a set of operational instructions represented by the procedural flow diagrams in FIGS. 3, 7A and 7B. The set of operational instructions represented by FIGS. 3, 7A and 7B could clearly be rearranged in other suitable flow diagrams. Thus, FIGS. 3, 7A and 7B are intended to be only illustrative of one suitable set of flow diagrams for operating the system.

Referring first to FIGS. 1 and 3, the CPU 20 is initialized by a command signal from the input/output device 22. CPU 20 then loads the system control and keyword/path entry segments 24 and 25 (see FIG. 1) of the operational instructions from PROM 23 into the CPU's core memory (not shown). The system control operational instructions thereafter control the priority and scheduling of the operations performed by CPU 20. The keyword/path entry operational instructions control the operation of the CPU 20 and the other components of the system during path searching, encoding and storage, as described below.

An alphanumeric keyword is next entered into CPU 20 through input/output device 22. The keyword is stored in the core memory (not shown) of CPU 20. CPU 20 then retrieves the first level in the hierarchy of the hierarchal information tree electronically stored in ROM circuits 32-34. Retrieval of the first level of the hierarchy of the tree from ROM circuits 32-34 automatically accesses the corresponding alphanumeric description for each of the nodes in the first level of the hierarchy from ROM circuits 38-40. Thus, for the hierarchal information tree generally illustrated in FIG. 2, the list of nodes A, B and C is displayed on the screen of the output device 22.

Figures 2, 4, 5, 6:
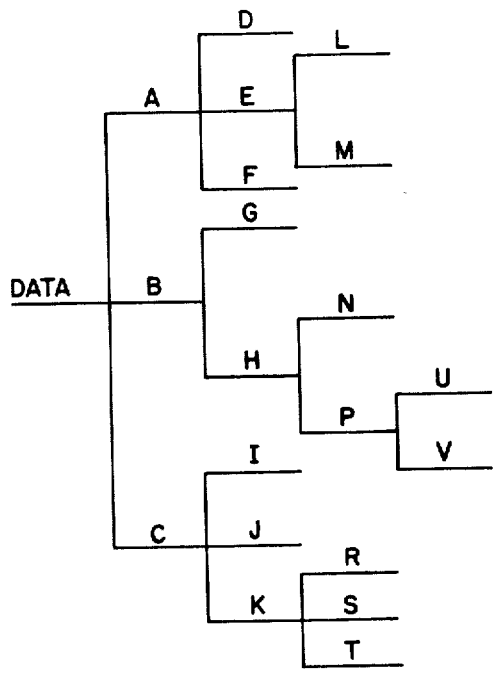
FIG. 2 is a schematic diagram generally illustrating a hierarchal information tree used for classifying data.
FIG. 4 is a schematic block diagram illustrating the storage of an encoded set of paths in a buffer register.
FIG. 5 is a schematic block diagram illustrating the storage of an encoded set of paths in a buffer register after compacting the format of the encoded paths.
FIG. 6 is a schematic block diagram illustrating a logical arithmetic unit used to combine one or more encoded set of paths.

The appropriate subsets of data represented by nodes A, B and C are then selected. For each node that is selected, a bit in the register 62 is turned on. For example, if nodes B and C were selected then the corresponding binary representation for the bits in register 62 would be 011, as illustrated in FIG. 4.

Once the selections have been made for the first level in the hierarchy of the information tree, the CPU 20 advances to the succeeding level in the tree's hierarchy. However, only those groups of nodes for which the preceding node was selected are now retrieved. For example, since node A (called a "father" node) was not selected, the nodes D, E and F (called "son" nodes) in the second level of the hierarchy are not displayed. Conversely, since each of the father nodes B and C were selected, their corresponding son nodes G-H and I-K are displayed. Appropriate selections are then again made for the displayed nodes and the process is then repeated until each of the nodes A-V in the hierarchal information tree have thus been searched. In this manner, a string of binary digits is generated in register 62 which corresponds to the set of paths that has been traced through the hierarchal information tree while selecting the various nodes which correspond to a given attribute. It will of course be recognized that the various nodes in the hierarchal information tree can be traced from father node to son node in a horizontal fashion, or in a vertical fashion by tracing father node to father node within each level of the hierarchy.

As hereinafter more fully described, the bit string representation for this set of multiple paths that has been traversed can subsequently be used to rapidly effect retrieval, separation, comparison and selected combinations of data so as to provide concurrent multiple path access to that data which corresponds to a selected combination of attributes. Furthermore, storage of the bit string representation for the set of paths traversed through the hierarchal information tree is much more compact and efficient than storage of the data which is accessed through the set of paths. For example, this method of data storage as opposed to lists and pointers and other known prior art data storage methods permits the data that has been searched to be stored in approximately 1/10th of the storage space otherwise required.

With continued reference to FIGS. 1 and 3, once the set of paths traversed through the hierarchal information tree have been encoded as described above and stored in register 62, the encoded set of paths is then transferred to the special purpose module 58. Special purpose module 58 is programmed to scan each group of nodes and to eliminate from the format of the encoded set of paths each group of nodes which was not selected. Thus, in the example described above, bits for each of the nodes in the node groups D-F and L-M are eliminated since none of the nodes in either of those groups was selected. The remaining bits for the encoded set of paths are then transferred from the special purpose module 58 to buffer register 54 (see also FIG. 5). The encoded set of paths is then transferred from buffer register 54 to a storage location in one of the RAM circuits 46-48. In this manner, the format for the encoded set of paths is compacted so as to further reduce the storage requirements for the encoded set of paths.

At the same time the encoded set of paths is transferred from register 54 into the RAM circuits 46-48, the alphanumeric keyword retained in the core memory (not shown) of CPU 20 is also transferred to RAM circuits 46-48 and associated with the encoded set of paths. Thus, the keyword identifies the encoded set of paths. In turn, each keyword corresponds to a particular attribute for which the data base has been searched. Accordingly, a series of keywords each having an associated encoded set of paths may be developed and stored in the RAM circuits 46-48.

After all searching of the data base has been completed and the appropriate keywords together with their associated encoded paths have been stored, each keyword with its set of encoded paths may be selectively retrieved and combined with other encoded paths so as to produce a unique set of encoded paths which provides concurrent multiple path access to all data corresponding to any desired combination of attributes. Alternatively, as hereinafter more fully described in connection with FIG. 14, each retrieved path may be used to identify an attribute that is stored in the hierarchy of a decision table tree, thereby providing access through the decision table tree to all data corresponding to the desired combination of attributes.

Referring now to FIGS. 1, 7A and 7B, CPU 20 is again initialized and a retrieve keyword command is entered into CPU 20 from input/output device 22. The keyword/path retrieval segment 26 of the operational instructions from prom 23 is then loaded into the CPU's core memory (not shown). These operational instructions thereafter control the CPU 20 and the other components of the system to effect retrieval, separation, comparison and other interrelation of the stored data.

In response to the retrieve keyword command, CPU 20 accesses RAM circuits 46-48 through line 50 and loads the appropriate set of encoded paths identified by the keyword through line 52 into buffer register 54. The encoded set of paths is then transferred from buffer register 54 to microprocessor 58. Microprocessor 58 operates according to the set of instructions illustrated in the broken line box 80 shown in FIG. 7A. Alternatively, it should be noted that CPU 20 could likewise be operated according to the same set of instructions 80 as microprocessor 58. However, in practice the microprocessor 58 is employed to enhance the speed and efficiency of the overall storage and retrieval system.

As shown in FIG. 1, microprocessor 58 accesses through line 82 the hierarchal information tree electronically stored in ROM circuits 32-34. As hereinafter more fully described, microprocessor 58 uses the hierarchal information tree to determine relationships between father nodes and son nodes so as to be able to expand the format for a set of encoded paths from the previously compacted format back to the original format.

Thus, according to the set of instructions 80 (see FIG. 7A), microprocessor 58 first scans the contents of register 54 for those bits corresponding to the nodes in the first level of the hierarchy of the information tree retrieved from ROM circuits 32-34. For each bit in register 54 corresponding to a father node that was not selected (i.e. a zero bit), all corresponding son node bits in register 62 are set to zero. For example, as illustrated in FIGS. 4 and 5, since node A was not selected, the son nodes D, E and F corresponding to father node A are set to zero in register 62. For each of the bits corresponding to father nodes which were selected (i.e. bits B and C in the example shown in FIG. 5), the corresponding son nodes are transferred directly from register 54 into register 62. Thus, the bits for son nodes G and H and the bits for son nodes I, J and K are transferred from register 54 directly into buffer register 62 (see FIGS. 4 and 5). This process is then repeated for each of the nodes in the next level of the hierarchy and so on until all levels in the hierarchy have been completed. Upon completion, register 62 (FIG. 4) will contain the encoded set of paths in its original format. The contents of register 62 are then transferred to register 70.

Referring again to FIG. 7A, once microprocessor 58 has completed the set of instructions 80, CPU 20 next selects another keyword and the set of encoded paths for that keyword are transferred to register 54. Microprocessor 58 then repeats the set of instructions 80 for that set of encoded paths and the expanded set of paths for the second keyword is then retained in register 62.

Subsequently, the contents of registers 62 and 70 are gated into the logical arithmetic unit 60. Arithmetic unit 60 may combine the encoded paths according to any one of a plurality of selected functions. For example, as illustrated in FIG. 6, the encoded sets of paths for keyword 1 and keyword 2 may be combined according to the logical AND function. The AND function is well known in digital logic and results in a selection of those bits where corresponding bits in both the keywords were previously selected. For example, as shown in FIG. 6, bits corresponding to the nodes B, H, P, U and V were previously selected in the set of encoded paths for both keywords. Thus, the resulting set of encoded paths defines a series of concurrent paths through the hierarchal information tree which accesses only that data corresponding to the attributes represented by keyword 1 and keyword 2. All other data has been selectively eliminated through the combination of the encoded sets of paths for the keywords according to the logical AND function.

Significantly, it should be noted that the encoded sets of paths may be combined in parallel since they are in binary form. This greatly reduces the time involved in manipulating the data. It should also be noted that any desired function such as an OR or EXCLUSIVE OR function may be employed by the logical arithmetic unit 60 in combining of the encoded sets of paths.

Referring to FIGS. 1 and 7B, the resulting set of encoded paths produced in arithmetic unit 60 is then transferred back to register 70. This resulting set of encoded paths may thereafter be further combined with other sets of encoded paths until a particular set of encoded paths is finally produced which corresponds to any given combination of attributes.

The contents of register 70 are then transferred to CPU 20. CPU 20 then uses the particular set of encoded paths to access the data which is classified under the hierarchal information tree electronically stored in ROM circuits 32-34. As previously described, CPU 20 selectively accesses the data contained in ROM circuits 32-34, and the corresponding alphanumeric descriptions for this data are simultaneously accessed in ROM circuits 38-40. These descriptions are sent through line 44 to CPU 20 and are then output on the screen of the input/output device 22.

From the foregoing general description, it should be appreciated that several distinct advantages not realized by prior art information storage and retrieval systems are realized. For example, the information storage and retrieval system and method of the present invention provides for greatly increased efficiency in the storage of data by providing for storage of the encoded path representations which access the data rather than storing lists of selected data. Furthermore, by manipulating the encoded set of paths for each keyword corresponding to a particular attribute which has been searched, it is not necessary to manipulate the data base by generating long lists and pointers for purposes of comparing and separating the data. Instead, the encoded sets of paths which provide access to selected data are directly manipulated so as to provide concurrent multiple path access to all data corresponding to a selected combination of attributes. As further described below, this feature greatly enhances the decision making capability of the information storage and retrieval system.

2. The Embodiment of FIGS. 8-14

As pointed out above, major problems which have long been recognized by large manufacturng facilities are the problem of inefficient routing of a part from one work station to another work station coupled with the failure to follow the same manufacturing process for subsequent parts that are the same or similar to parts previously manufactured. It has thus long been recognized that it would be highly desirable to provide computerized process plans for each individual part so as to standardize and maximize the efficiency for the manufacturing process for each part. However, as noted above, large manufacturing plants such as aircraft companies may oftentimes have as many as a half a million active parts in their inventory at any given time. The data base corresponding to this active inventory is therefore very large. Prior art information storage and retrieval systems, as for example those designed to provide lists and pointers for the data, must directly store, retrieve and manipulate the data base. Because of the large data base, the large number of possible routings for a part, and the inherent difficulty in systematically defining the selection of any given routing for a part, prior art systems and methods have not been capable of economically providing computerized standard process plans for each individual part.

In contrast, the system and method of the present invention provide a significant advancement in the state of the art. By storing, retrieving and manipulating the encoded paths which access the data rather than the data base itself, the system and method of the present invention significantly expands the decision making capability of the system. Furthermore, the storage requirements and retrieval times required by the system are greatly reduced. Consequently, as hereinafter described, the information storage and retrieval system of the present invention is capable of providing computerized standard process planning for each individual part manufactured at a large manufacturing facility.

Figure 8:
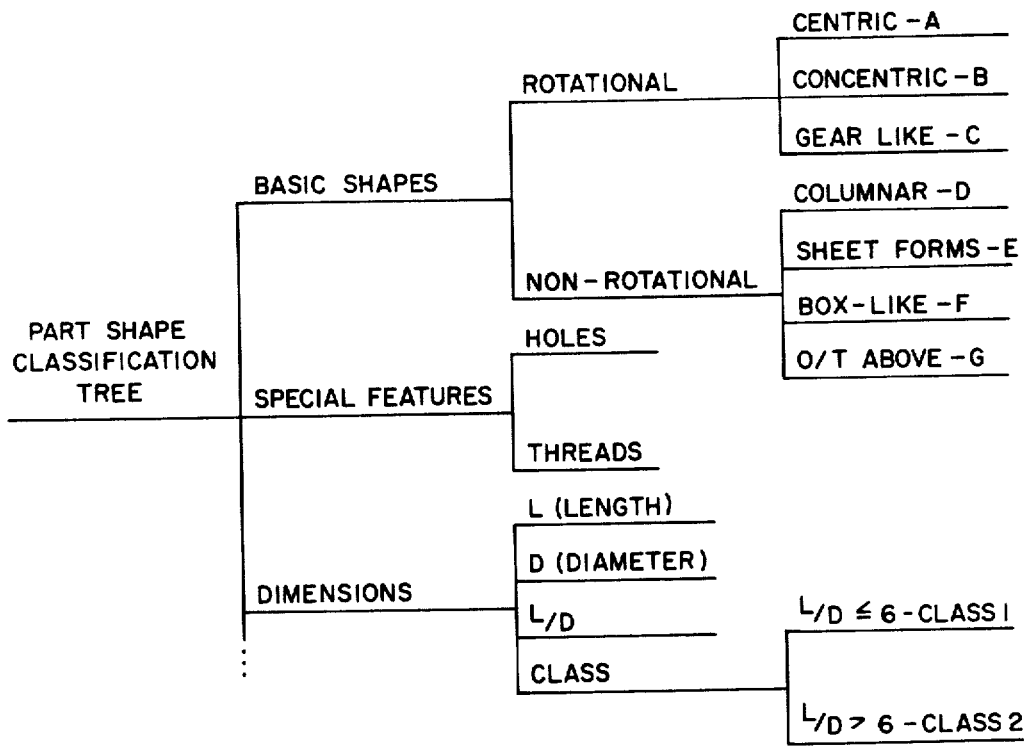
FIG. 8 is a diagram illustrating a portion of an exemplary hierarchal information tree used for classifying part shape data.

Referring to FIG. 8, it will be seen that a hierarchal information tree is first developed for part shape classification data. For ease of illustration, only a portion of the hierarchal information tree for part shape classification has been illustrated in FIG. 8. Each of the nodes in the hierarchal information tree illustrated in FIG. 8 corresponds to a particular attribute of a part shape such as rotational, non-rotational, holes, threads, etc. It will be appreciated that any desired classification scheme for the part shapes may be developed.

Once the hierarchal information tree for the part shape classification data has been developed, the individual attributes at each of the nodes of the tree are electronically encoded and stored in ROM circuit 32 (see FIG. 1) in the manner previously described. Similarly, the corresponding alphanumeric description for each of the nodes is encoded and stored in ROM circuit 38.

Figure 9:
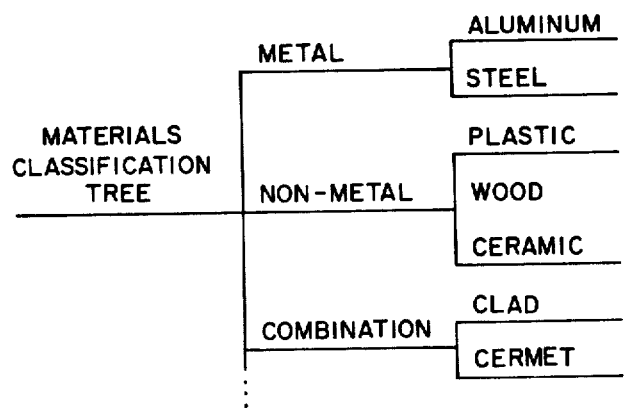
FIG. 9 is a diagram illustrating a portion of an exemplary hierarchal information tree for classifying materials selection data.

FIG. 9 illustrates a portion of a hierarchal information tree which has been developed for classification of materials selection data. Each of the nodes in the hierarchal information tree of FIG. 9 corresponds to a particular attribute which identifies a type of material to be used. The materials attributes of this tree are likewise encoded and stored in ROM circuits 33 and 39.

Figure 10:
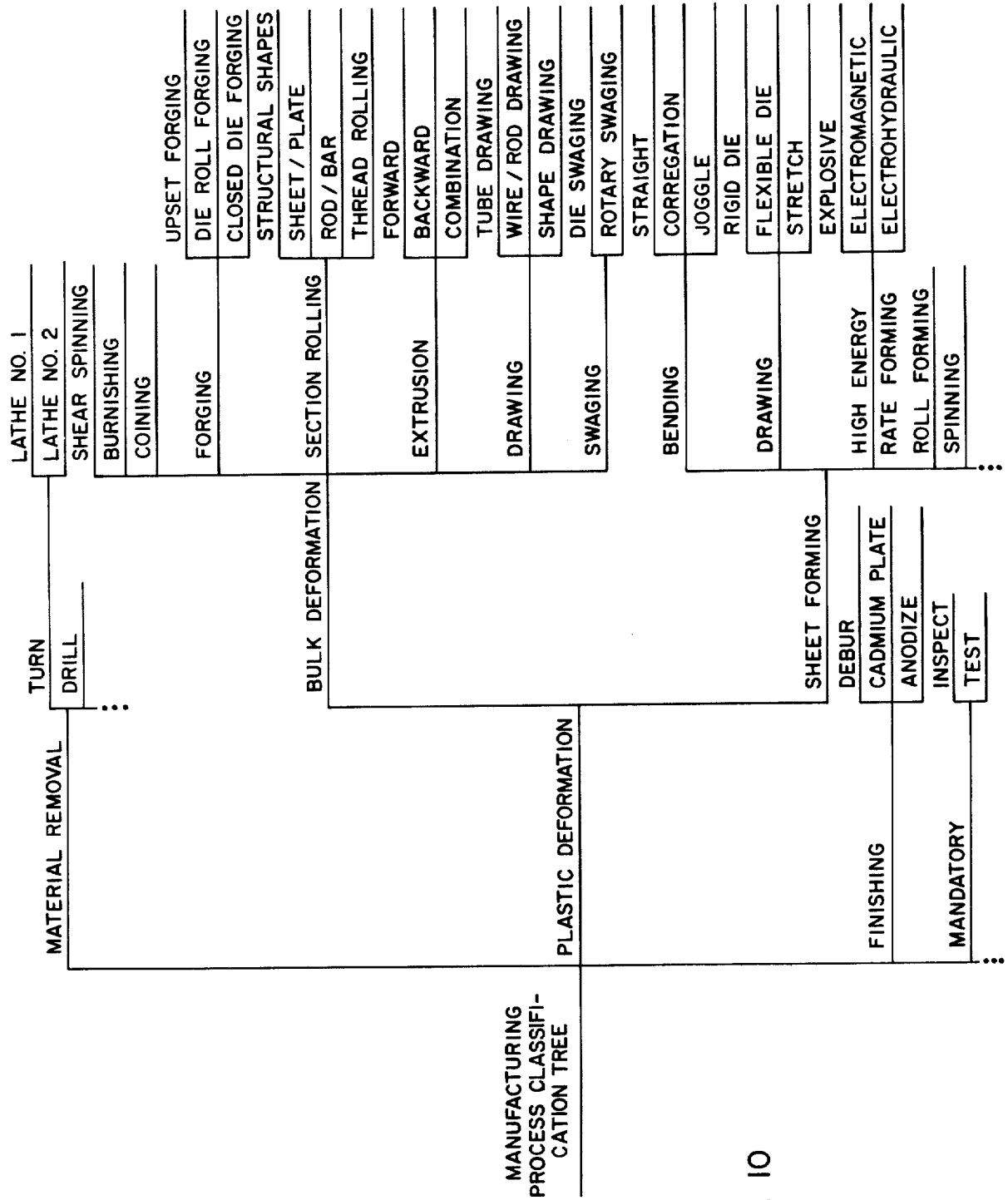
FIG. 10 is a diagram illustrating a portion of an exemplary hierarchal information tree for classifying manufacturing processes.

FIG. 10 illustrates a portion of a hierarchal information tree which has been developed for the classification of all possible manufacturing operations which may be performed at a manufacturing plant. Each node of this tree corresponds to a particular manufacturing operation which may be performed. The data classified under this hierarchal information tree is electronically encoded and stored in ROM circuits 34 and 40.

As hereinafter more fully described, an optimal sequence of manufacturing operations may be identified and stored for each of the part shape and materials attributes of the information trees of FIGS. 8 and 9. The optimal set of manufacturing operations for each part shape and materials attribute may thereafter be selectively combined to identify a unique set of manufacturing processes for each part to be manufactured.

Using the method described in Section 1 of the specification above, keywords corresponding to each of the part shape and materials attributes of the trees in FIGS. 8 and 9 are entered and the hierarchal information tree which classifies the available manufacturing operations (see FIG. 10) is then traversed for each such keyword so as to develop an encoded set of paths for each keyword. Each such encoded set of paths provides access through the manufacturing process classification tree to an optimal sequence of manufacturing operations that corresponds to the particular part shape or type of material selected. Each keyword with its corresponding set of encoded paths is then stored in one of the RAM circuits 46-48 (see FIG. 1).

Figures 11, 13, 14:
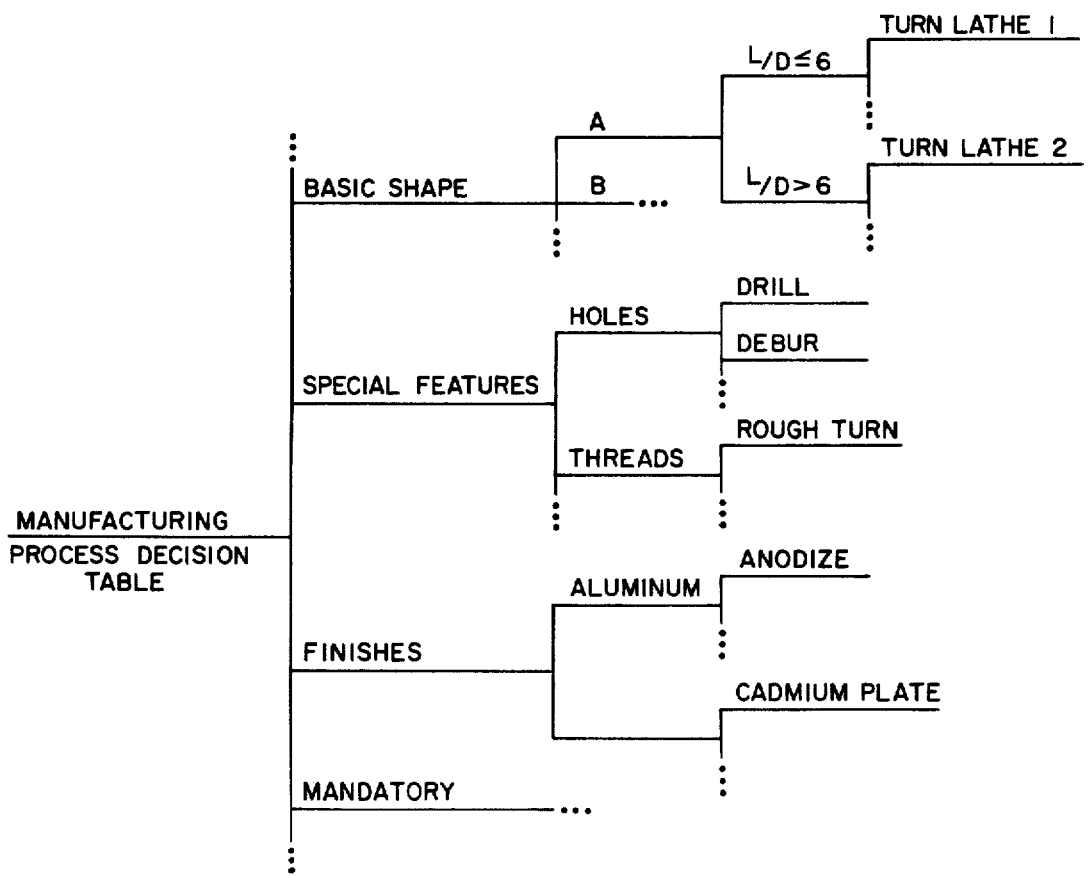
FIG. 11 is a schematic block diagram illustrating the storage of various keywords with their associated encoded path representations.
FIG. 13 is a schematic block diagram illustrating the storage of an encoded path representation for a particular sequence of manufacturing operations for a part which is to be manufactured.
FIG. 14 diagrammatically illustrates a hierarchal decision table tree which may be used with the information storage and retrieval system and method of the present invention.

For example, as illustrated in FIG. 11, the keywords A, HOLES, CLASS 1 and STEEL have each been developed and for each of the keywords a set of encoded paths has been stored. As shown in FIG. 8, the keyword A corresponds to the part shape attribute classified as basic shape—rotational—centric. Similarly, the keyword HOLES corresponds to the part shape classification special features—holes. The bit string representation for the encoded set of paths identified by keyword HOLES accesses an optimal sequence of manufacturing operations for producing holes in a part—for example, drilling and deburring.

As described more fully below, once the encoded set of paths defining an optimal sequence of manufacturing operations has been developed for each selected keyword, computer process plans for each individualized part may then be readily developed. Significantly, an important advantage of the system and method of the present invention is that experienced process planners may be used to develop the encoded set of plans for each keyword that define the optimal manufacturing process for the attribute corresponding to that keyword. In other words, the sequence of manufacturing operations accessed by each set of encoded paths is determined only once by a highly experienced process planner. This enables less experienced process planners and other clerical personnel to be able to reliably develop process plans which are based upon the logic and experience of those who are most experienced and skilled in the art of process planning.

Figure 12:
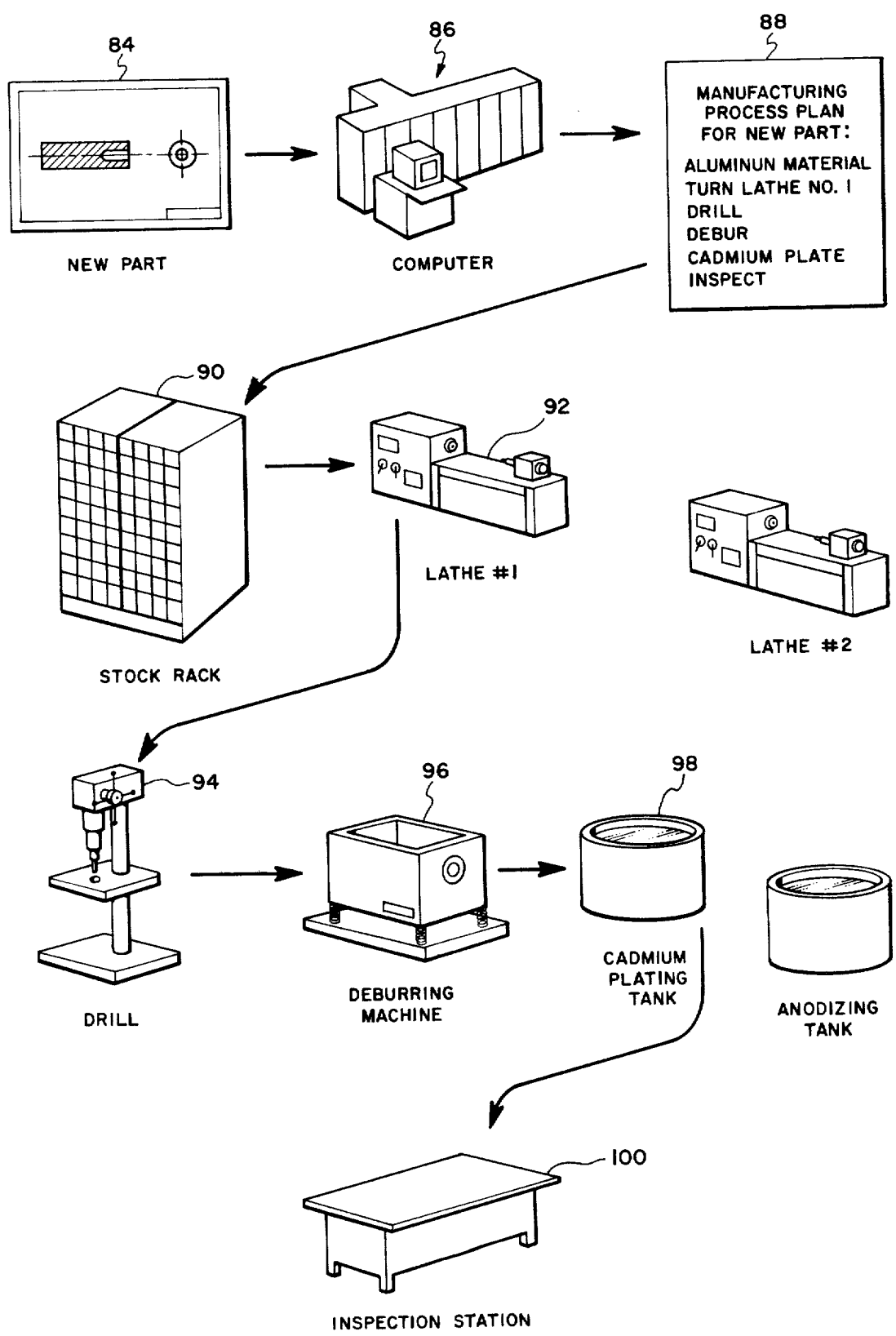
FIG. 12 is a schematic diagram illustrating a sequence of manufacturing operations developed according to the information storage and retrieval system and method of the present invention.

Referring to FIG. 12, it will be seen that the operation of the system to develop an individualized, standard process plan for a particular part begins with a part drawing such as that schematically illustrated at 84. Part drawing 84 provides information as to the particular shape of the part and the particular materials to be used in making the part.

Next, CPU 20 retrieves the part shape classification data classified under the hierarchal information tree stored in ROM circuit 32. Each level of the hierarchy of the part shape tree is sequentially retrieved by CPU 20 and the corresponding alphanumeric descriptions for the particular part shape attributes located at the nodes of the tree are displayed on the screen of the input/output device 22. According to the particular shape of the part illustrated in the drawing 84, part shape attributes are then selected from the various nodes in each level of the part shape hierarchal information tree. The keywords corresponding to each selected attribute are entered and stored in the core memory (not shown) of CPU 20. In a like fashion, the hierarchal information tree for the materials selection data is retrieved from ROM circuits 33 and 39 and appropriate materials attributes are selected in accordance with drawing 84. The keywords corresponding to the materials attributes are also entered and stored in the core memory (not shown) of CPU 20.

Once the appropriate keywords have been entered for all of the part shape and materials attributes corresponding to drawing 84, CPU 20 then scans RAM circuits 46-48 and locates all keywords in the RAM circuits 46-48 which correspond to the keywords contained in the core memory (not shown) of CPU 20. For example, if the keywords A, HOLES, CLASS 1 and STEEL had been entered into CPU 20, each set of encoded paths corresponding to those keywords would have been identified by CPU 20 in RAM circuit 46, as illustrated in FIG. 11.

In the same manner as that previously described, each encoded set of paths for each of the identified keywords is then sequentially sent to buffer register 54, expanded by microprocessor 58, transferred to register 70 and then combined with a succeeding set of encoded paths in logical arithmetic unit 60. It should be noted that the particular functions for combining the set of encoded paths may be preprogrammed and stored with each set of encoded paths for a particular keyword or they may be entered manually at the time it is desired to combine the encoded set of paths.

Once the encoded set of paths for each keyword identified by CPU 20 has been combined, the resulting set of encoded paths is then transferred from buffer register 70 back to CPU 20. CPU 20 then uses this particular set of encoded paths to search the manufacturing operations hierarchal information tree (see FIG. 10) stored in ROM circuit 34. The unique sequence of manufacturing operations for the part which is to be made is thus identified and the corresponding alphanumeric descriptions for the unique sequence of manufacturing operations is then sent from ROM circuit 40 to CPU 20.

As shown in FIG. 12, this unique sequence of manufacturing operations is then output as illustrated at 88 through input/output device 22 (see FIG. 1). The unique sequence of manufacturing operations is then followed for purposes of manufacturing the part. For the particular example illustrated in FIG. 12, raw aluminum material would first be retrieved from the stock rack 90. The raw material would then be taken to station 92 where it would be turned on lathe number 1, from there the part would be transferred to work station 94 where it would be drilled, then to work station 96 where it would be deburred, then to station 98 for cadmium plating and finally to station 100 for inspection.

Significantly, since the unique sequence of manufacturing operations is based on a combination of optimal manufacturing processes for each selected attribute, the resulting process plan will be consistent with the logic and experience of a company's best process planners. Additionally, the storage requirements are reduced by approximately 1/10th, the particular set of encoded paths representing this unique sequence of manufacturing operations for this particular part may then be stored with an encoded part number on a secondary storage device such as a disk or tape (see FIG. 13). Subsequently, if it is desired to manufacture additional parts according to drawing 84, the particular part number may be retrieved and the identical sequence of manufacturing operations may then be quickly reidentified. In this manner, subsequent parts will be manufactured according to the same sequence of operations.

FIG. 14 illustrates a hierarchal decision table tree which may be developed for purposes of providing both classification and decision making with respect to available manufacturing operations. In the decision table tree of FIG. 14, the keywords corresponding to the part shape and materials attributes are incorporated together with the various manufacturing operations directly into the various levels of the hierarchy of the tree. When the hierarchal information tree illustrated in FIG. 14 is used, rather than developing an encoded set of paths which identifies an optimal sequence of manufacturing operations for each part shape or materials attribute, an encoded set of paths is developed which identifies each keyword corresponding to a part shape or materials attribute selected when searching the part shape and materials classification trees. Thus, rather than retrieving an encoded set of paths for each keyword and thereafter combining each encoded sets of paths, CPU 20 may directly recall the decision table tree from ROM circuit 34 and may use the keywords identified by each encoded path to traverse the decision table tree thereby directly identifying each of the manufacturing operations corresponding to the selected set of keywords.

For example, as illustrated in FIG. 14, various of the materials and shape attributes such as holes, threads, L/D<6, L/D>6, aluminum, etc. that are classified in the part shape and materials classification trees (see FIGS. 8 and 9) are also incorporated into the hierarchal structure of the process decision table tree in FIG. 14. With reference to FIG. 14 it will be seen that each attribute that matches one of the attributes in the part shape or materials classification trees of FIGS. 8 and 9 terminates in a particular group of nodes that define the manufacturing operations for producing that attribute. For example, the attribute of "holes" in FIG. 14 matches the part shape attribute "holes" that is also found in the part shape tree (FIG. 8). However, note that in FIG. 14 the attribute "holes" terminates in a group of nodes (i.e. drill, debur, etc.) that defines the manufacturing operations necessary to produce the attribute "holes." Thus, each matching attribute incorporated from the classification trees of FIGS. 8 and 9 into the hierarchal tree structure of FIG. 14 represents a predetermined selection or decision as to the particular manufacturing operations(s) necessary to produce the matching attributes.

The method for using the decision table tree of FIG. 14 to generate a manufacturing process plan for a new part is based upon the same basic operation of the information storage and retrieval system as generally described in connection with FIGS. 1-7. Thus, as noted above, the part shape and materials classification trees of FIGS. 8 and 9 are stored in ROM circuits 32 and 33 and their corresponding alphanumeric descriptions are stored in ROM circuits 38 and 39. The process decision table tree of FIG. 14 and its corresponding alphanumeric description are stored in ROM circuits 34 and 40, respectively.

When a new part drawing is received the part shape and materials classification trees of FIGS. 8 and 9 are each searched and attributes are selected from those trees which are descriptive of the new part. As the classification trees of FIGS. 8 and 9 are searched, an encoded set of paths (i.e bit string representation) is generated by CPU 20 for each tree and stored. Subsequently, each encoded set of paths may be retrieved and used to identify the particular subset of part shape or materials attributes selected from the classification trees in FIGS. 8 and 9, in the same manner as heretofore explained. CPU 20 then recalls the decision table tree of FIG. 14 from ROM circuit 34 and uses the attributes identified by each encoded path to find the matching attributes in the hierarchy of the decision table tree, thereby automatically identifying each group of nodes that contain the manufacturing operations for producing the matching attributes.

From the foregoing description, it will be appreciated that the information storage and retrieval system and method of the present invention provide highly efficient storage, retrieval, separation, comparison and interrelation of retrieved data.

The invention may be embodied in other specific forms without departing from its spirit or essential characteristics. The described embodiments are thus to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed to and desired to be secured by United State Letters Patent is:

1. In a computer system having a CPU, an input/output device electronically coupled to said CPU, a first storage means electronically coupled to said CPU and a second storage means electronically coupled to said CPU, a method of information storage and retrieval comprising the steps of:

(1) logically classifying a body of data and arranging sid classified data in the form of a hierarchal information tree having a plurality of mutually exclusive paths leading to the classified data located at various levels in the hierarchy of said tree;

(2) storing said hierarchy of classified data in said first storage means;

(3) entering one or more keywords at said input/output device;
(4) generating at said input/output device a display of the mutually exclusive paths for one or more said levels in the hierarchal structure of said tree;
(5) selecting from the mutually exclusive paths displayed at said input/output device a concurrent set of paths leading through said hierarchal tree to a new subset of data;
(6) encoding each selected set of concurrent paths in a single bit string representation;
(7) storing each encoded set of concurrent paths;
(8) generating at said input/output device a list of one or more keywords;
(9) retrieving from said second storage means one or more of said encoded sets of concurrent paths corresponding to the keywords generated at said input/output device; and
(10) displaying at said input/output device the subset of data accessed through said hierarchal tree by each said retrieved set of concurrent paths.

2. A method as defined in claim 1 wherein said computer system further comprises a microprocessor electronically interconnected between said CPU and said second storage means, and wherein said method further comprises the steps of:
transmitting each encoded set of paths to said microprocessor prior to storage in said second storage means;
using said microprocessor to compact the format length of each said encoded set of paths prior to storage;
transmitting each retrieved set of encoded paths to said microprocessor; and
using said microprocessor to expand the format length of each said retrieved encoded set of paths back to its original format length prior to using said retrieved encoded set of paths to access data.

3. A method as defined in claim 1 further comprising the steps of:
entering a logical combination of keywords at said input/output device;
retrieving from said second storage means each encoded set of concurrent paths addressed by the entered keywords; and
logically intersecting one or more of said retrieved encoded sets of paths so as to identify a resulting set of encoded concurrent paths that will provide concurrent multiple path access through said hierarchal tree to the intersection of all data subsets corresponding to the logical combination of keywords entered at said input/output device.

4. In a computer system comprising a CPU with a main programmed memory, an input/output device electronically coupled to said CPU, and first and second storage memories electronically coupled to said CPU, a method of storing, interrelating and retrieving data that has been logically classifed and arranged in the form of a hierarchal information tree having a plurality of mutually exclusive paths leading to the classified data located at various levels in the hierarchy of said tree, the method comprising the steps of:
(1) storing said hierarchy of classified data in said first storage memory;
(2) recalling from said first storage memory and generating at said input/output device a display of the mutually exclusive paths for one or more said levels in the hierarchal structure of said tree;
(3) selecting from the mutually exclusive paths displayed at said input/output device a concurrent set of paths leading through said hierarchal tree, said concurrent set of paths identifying a new subset of data retrievable from the hierarchal tree structure;
p1 (4) encoding said concurrent set of paths in a single bit string and thereafter storing the encoded set of concurrent paths in said second storage memory;
(5) repeating steps (1) to (4) a selected number of times;
(6) recalling from said second storage memory two or more of the encoded sets of concurrent paths;
(7) logically intersecting two or more said retrieved sets of concurrent paths such that a new set of encoded paths will result;
(8) decoding said new set of concurrent paths resulting from step (7); and
(9) displaying at said input/output device the data accessed through said hierarchal tree by said new set of concurrent paths resulting from step (7).

5. In a computer-assisted manufacturing plant having a CPU with a main memory, an input/output device electronically coupled to said CPU, and a storage memory electronically coupled to said CPU, a method of planning and standardizing each sequence of manufacturing operations to be performed in manufacturing a plurality of different parts, the method comprising the steps of:
(1) logically classifying and arranging a plurality of part shape attributes in the form of a first hierarchal information tree having a plurality of mutually exclusive paths leading to the classified part shape attributes that are located at various levels in the hierarchy of said first tree;
(2) logically classifying and arranging a plurality of materials attributes in the form of a second hierarchal information tree having a plurality of mutually exclusive paths leading to the classified materials attributes that are located at various levels in the hierarchy of said second tree;
(3) logically classifying and arranging a plurality of manufacturing steps in the form of a third hierarchal information tree having a plurality of mutually exclusive paths leading to the classified manufacturing steps that are located at various levels in the hierarchy of said third tree;
(4) storing said first, second and third trees in said storage memory;
(5) entering one or more of said part shape attributes and said materials attributes at said input/output device, each said entered attribute defining a keyword;
(6) recalling from said storage memory and generating at said input/output device a display of the mutually exclusive paths for one or more levels in the hierarchal structure of said third tree;
(7) selecting from the displayed paths of said third tree a concurrent set of paths corresponding to one of said entered keywords, said concurrent set of paths identifying a series of manufacturing steps for producing the attribute defined by said keyword;
(8) encoding in a single bit string said concurrent set of paths selected in step (7), and storing said encoded set of paths in said main CPU memory in an address identified by said keyword;
(9) repeating steps (6) through (8) for each said keyword;

(10) obtaining a drawing of a part to be manufactured;

(11) recalling from said storage memory and generating at said input/output device a display of one or more levels in the hierarchy of each said first and second trees;

(12) selecting from the levels displayed in step (11) a list of one or more part shape and materials attributes that are descriptive of said part to be manufactured;

(13) identifying from said main CPU memory all keywords matching the attributes of said list;

(14) retrieving from said main CPU memory the encoded set of paths for each matching keyword;

(15) logically intersecting the encoded sets of paths retrieved in step (14), so that one encoded set of paths will result from said intersection;

(16) decoding the concurrent set of paths resulting from the intersection of step (15);

(17) generating at said input/output device a display of the manufacturing steps identified in said third tree by the concurrent set of paths decoded in step (16);

(18) obtaining the raw materials corresponding to the part to be manufactured; and

(19) manufacturing said part by performing the manufacturing steps displayed in step (17).

6. In a computer system comprising:

(A) a CPU with a main programmed memory;

(B) an input/output device electronically coupled to said CPU;

(C) first and second storage memories electronically coupled to said CPU; and (D) a data base stored in said first storage memory and comprising:

(i) a hierarchal information tree having a plurality of mutually exclusive paths leading to a plurality of attributes that are logically classified and located at various levels in the hierarchy of said tree; and (ii) a hierarchal decision table tree having a plurality of mutually exclusive paths leading to a plurality of attributes that match one or more of the attributes of said hierarchal information tree, each attribute in said decision table tree terminating in a group of nodes that identify a particular subset of data contained in said decision table tree;

a method of information storage and retrieval comprising the steps of:

(1) recalling from said first storage memory and generating at said input/output device a display of the mutually exclusive paths for one or more said levels of the hierarchal information tree;

(2) selecting from the mutually exclusive paths displayed at said input/output device a concurrent set of paths leading through said hierarchal information tree, said concurrent set of paths identifying a new subset of the attributes classified therein;

(3) encoding said concurrent set of paths in a single bit string and thereafter storing the encoded set of concurrent paths in said second storage memory;

(4) recalling said encoded set of concurrent paths from said second storage memory and identifying the subset of selected attributes accessed through said concurrent set of paths;

(5) searching said decision table tree for all attributes contained therein that match the attributes identified in step (4); and (6) displaying at said input/output device all data subsets defined by the attributes of said decision table tree found to match the attributes identified in step (4).

7. In a computer-assisted manufacturing plant comprising:

(A) a CPU with a main programmed memory;

(B) an input/output device electronically coupled to said CPU;

(C) first and second storage memories electronically coupled to said CPU; and (D) a data base stored in said first storage memory and comprising:

(i) a first hierarchal classification tree having a plurality of mutually exclusive paths leading to a plurality of part shape attributes that are logically classified and located at various levels in the hierarchy of said first tree;

(ii) a second hierarchal classification tree having a plurality of mutually exclusive paths leading to a plurality of materials attributes that are logically classified and located at various levels in the hierarchy of said second tree; and (iii) a hierararchal decision table tree having a plurality of mutually exclusive paths leading to a plurality of attributes that match one or more of the part shape and materials attributes of said first and second trees, each said matching attribute in said decision table tree terminating in a particular group of nodes which identify a series of manufacturing operations for producing the matching attribute;

a method of planning and standardizing each sequence of manufacturing operations to be performed in manufacturing a plurality of different parts, the method comprising the steps of:

(1) obtaining a drawing of a part to be manufactured;

(2) recalling from said first storage memory and generating at said input/output device a display of the mutually exclusive paths for one or more levels in the hierarchy of said first tree;

(3) selecting from the mutually exclusive paths displayed in step (2) a concurrent set of paths leading through said first tree, said concurrent set of paths identifying a subset of the part shape attributes classified in said first tree;

(4) encoding the concurrent set of paths of step (3) in a single bit string and thereafter storing the encoded set of concurrent paths in said second storage memory;

(5) recalling from said first storage memory and generating at said input/output device a display of the mutually exclusive paths for one or more of the levels in said second tree;

(6) selecting from the mutually exclusive paths displayed in step (5) a concurrent set of paths leading through said second tree, said concurrent set of paths identifying a subset of materials attributes classified therein;

(7) encoding the concurrent set of paths of step (6) in a single bit string and thereafter storing the encoded set of concurrent paths in said second storage memory;

(8) recalling each encoded set of concurrent paths from said second storage memory and identifying the subsets of selected part shape and materials attributes accessed through each said concurrent set of paths;

(9) searching said decision table tree for all part shape and materials attributes contained therein that match the part shape and materials atrributes identified in step (8);

(10) displaying at said input/output device all manufacturing operations defined by the attributes of said decision table tree that are found to match the attributes identified in step (8);

(11) obtaining the raw materials corresponding to the part to be manufactured; and

(12) manufacturing said part by performing the manufacturing operations displayed in step (10).

* * * * *

UNITED STATES PATENT AND TRADEMARK OFFICE
CERTIFICATE OF CORRECTION

PATENT NO. : 4,318,184
DATED : March 2, 1982
INVENTOR(S) : Ronald P. Millet et al.

It is certified that error appears in the above-identified patent and that said Letters Patent are hereby corrected as shown below:

Column 16, line 6 "pl(4)" should be --(4)--

Signed and Sealed this

Twenty-seventh Day of July 1982

[SEAL]

Attest:

Attesting Officer

GERALD J. MOSSINGHOFF
Commissioner of Patents and Trademarks